March 4, 1958 F. BRODSKY 2,825,192
BUTTER CUTTING AND BUTTER TRAY-FORMING MACHINE
Filed Dec. 19, 1955 4 Sheets-Sheet 1
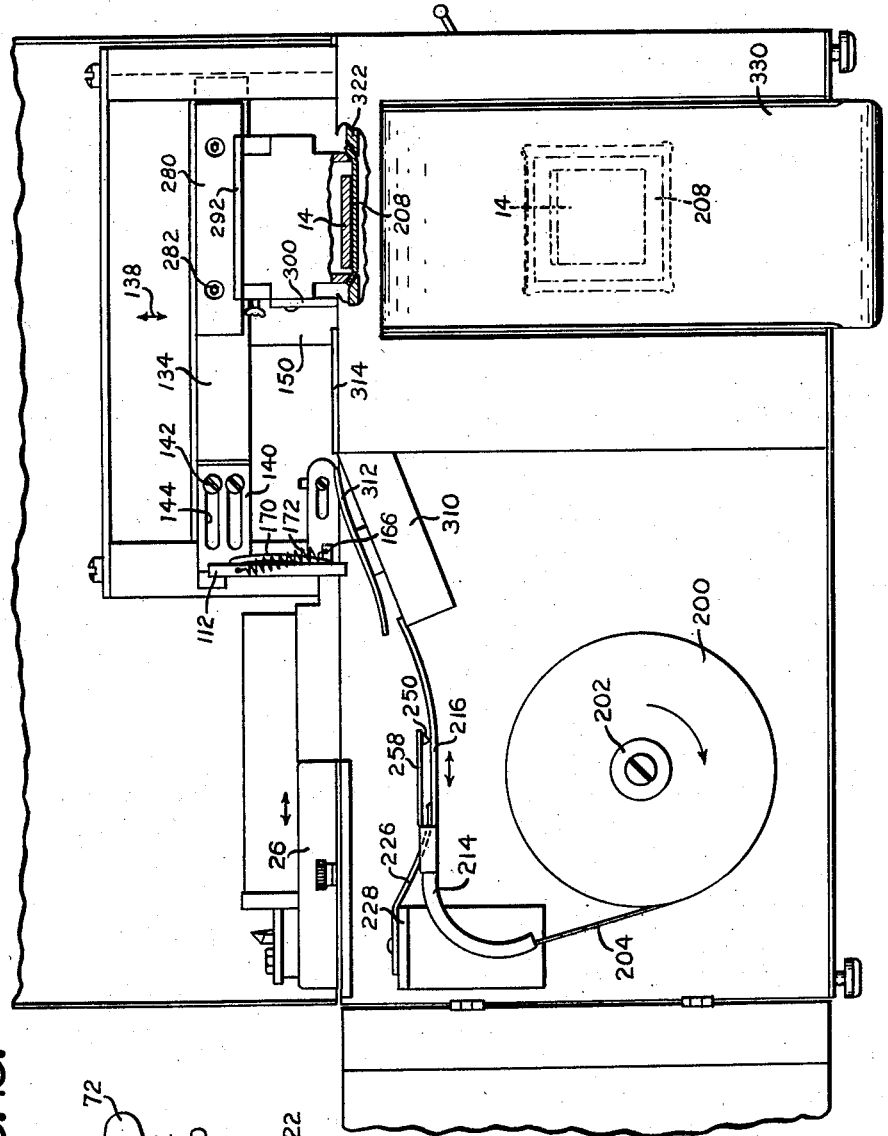
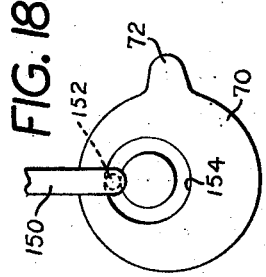
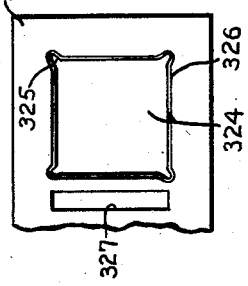
INVENTOR
FRANK BRODSKY.
BY
ATTORNEY March 4, 1958 F. BRODSKY 2,825,192
BUTTER CUTTING AND BUTTER TRAY-FORMING MACHINE
Filed Dec. 19, 1955 4 Sheets-Sheet 2
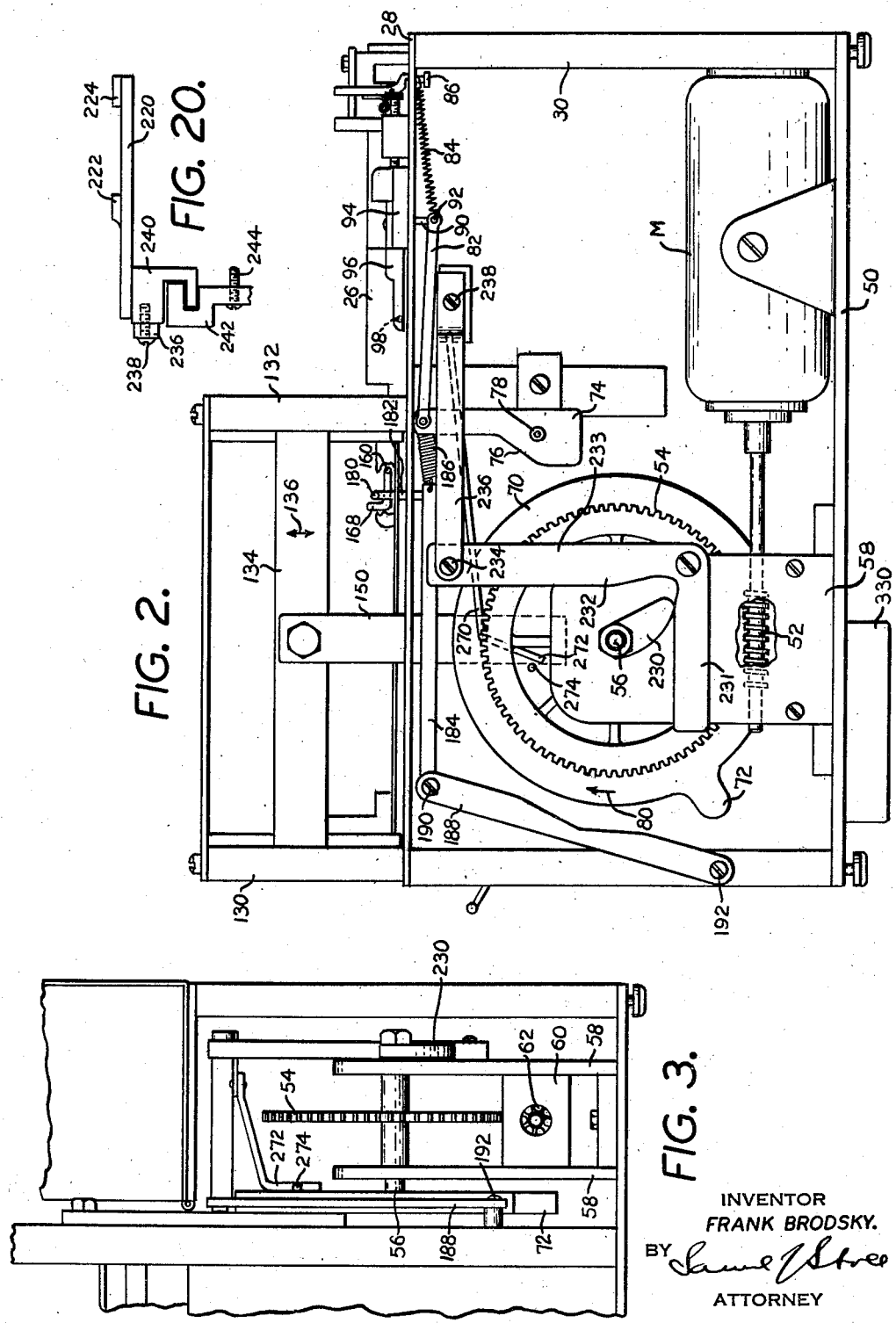
INVENTOR
FRANK BRODSKY.
BY
ATTORNEY

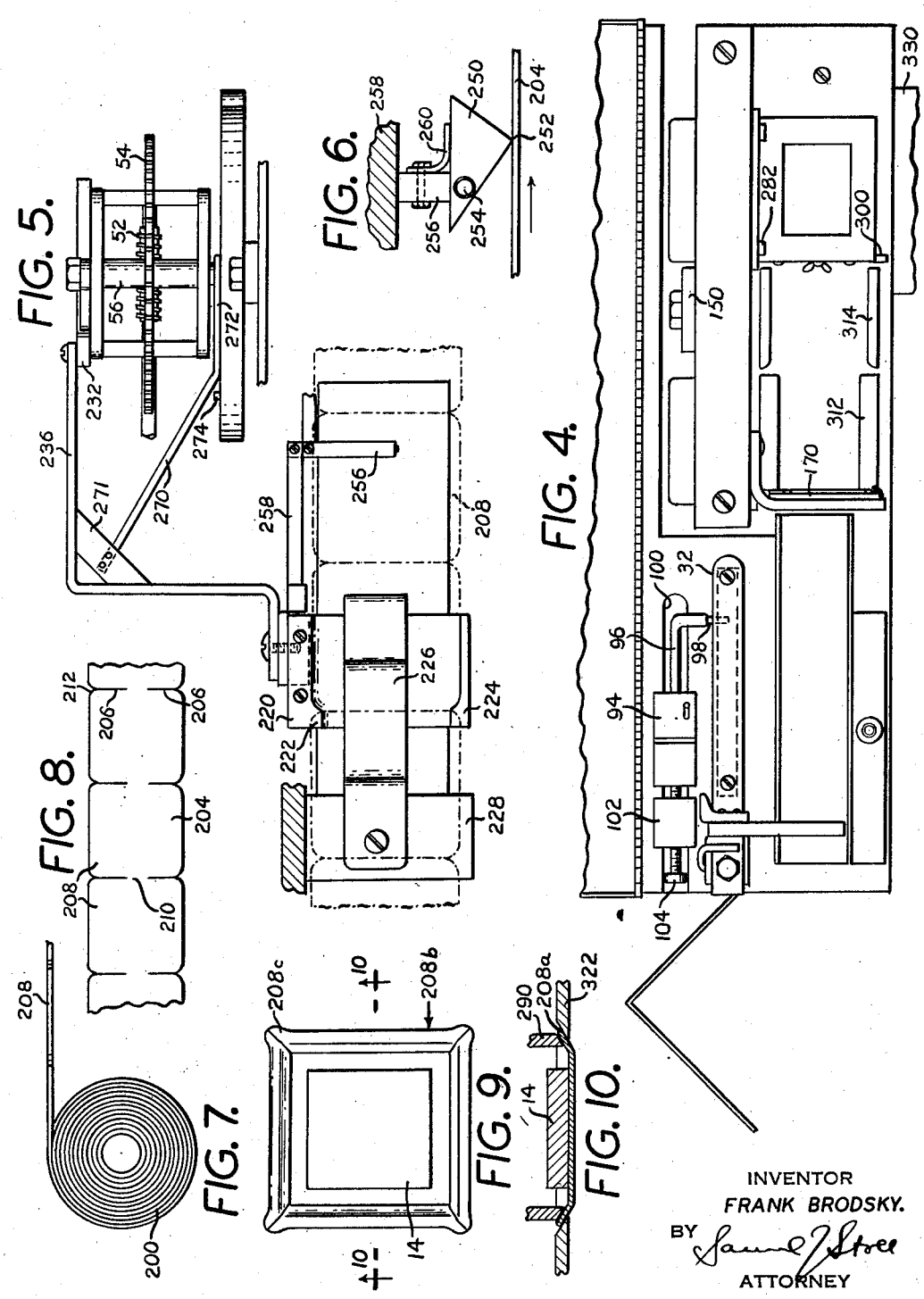

March 4, 1958 F. BRODSKY 2,825,192
BUTTER CUTTING AND BUTTER TRAY-FORMING MACHINE
Filed Dec. 19, 1955 4 Sheets-Sheet 4
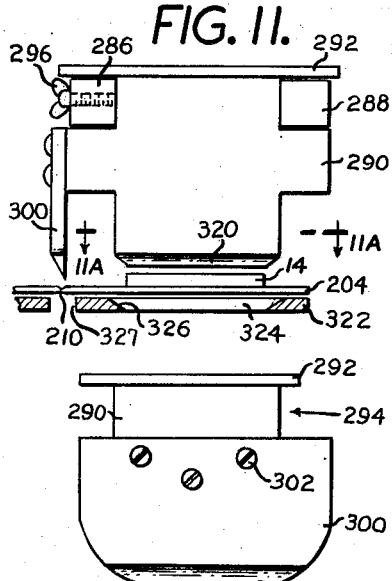
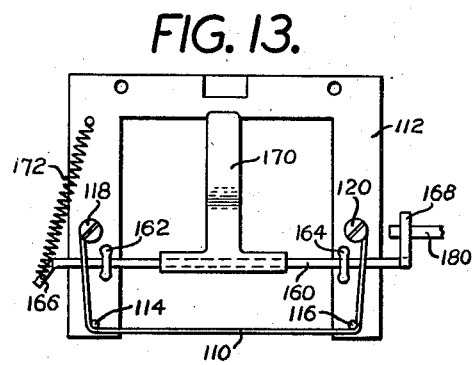
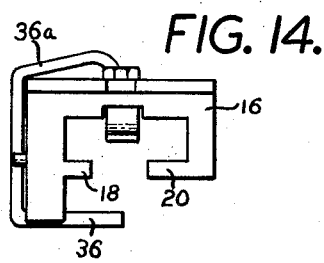
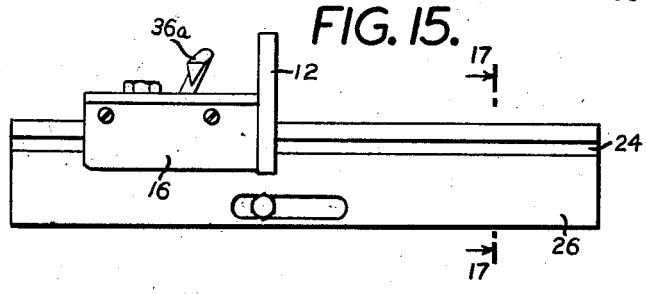
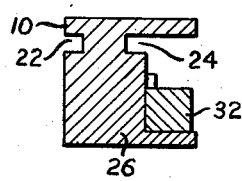
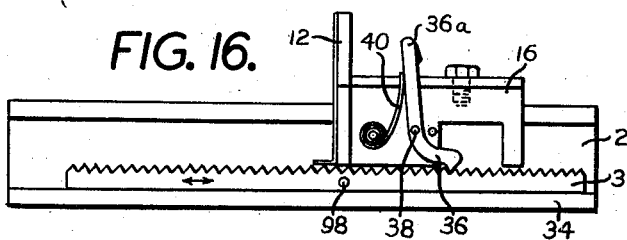
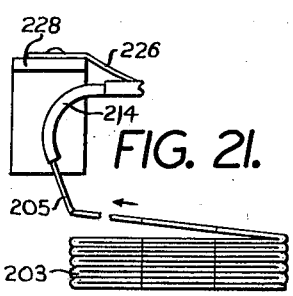
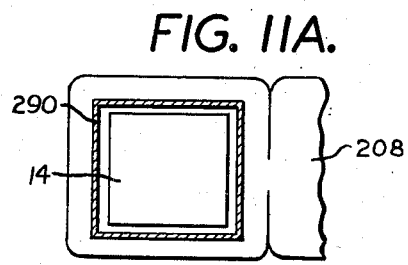
INVENTOR
FRANK BRODSKY.
BY
ATTORNEY United States Patent Office 2,825,192
Patented Mar. 4, 1958

2,825,192

BUTTER CUTTING AND BUTTER TRAY-FORMING MACHINE

Frank Brodsky, Brooklyn, N. Y.

Application December 19, 1955, Serial No. 553,814

4 Claims. (Cl. 53—123)

This invention relates to a butter cutting and butter tray forming machine.

The principal object of this invention is the provision of a machine which slices bars of butter to small rectangular pats of any selected thickness, deposits them upon a continuous strip of paper, cuts and forms said paper into individual trays or chips, each containing a single pat of butter, and then dispenses said trays or chips in any desired manner, for example, down a chute and into a suitable receptacle.

The machine herein described and claimed is fully automatic and synchronized in all of its operations. A bar of butter is placed on an adjustable intermittent feeding mechanism. A roll comprising a continuous strip of integrally connected tray blanks is fed to a second intermittent feeding mechanism. The first feeding mechanism feeds the butter to a reciprocating knife which slices the butter into individual pats and a flipper is provided to flip said pats of butter onto the individual tray blanks of said continuous strip. A second reciprocating knife is provided to sever the individual tray blanks from the strip and an open or hollow forming die is synchronized with said second knife to form each said blank into a tray without disturbing the pat of butter thereon.

An important object of this invention is the provision of an open or hollow forming die which is adapted to form a tray or chip of substantial depth from a flat blank without disturbing a pat of butter previously deposited on said blank.

The invention is illustrated in the accompanying drawing wherein:

Fig. 1 is a front view of a butter cutting and tray-forming machine made in accordance with this invention.

Fig. 2 is a back view of said machine.

Fig. 3 is a fragmentary end view of said machine.

Fig. 4 is a fragmentary top view showing the butter advancing or feeding mechanism and the slicing means.

Fig. 5 is a view of the paper feeding mechanism.

Fig. 6 is a side view showing a stop member which engages the paper and prevents it from moving backwardly.

Fig. 7 is a side view of a roll of paper suitable for use in making trays on the machine herein described.

Fig. 8 is a fragmentary view of a strip of such paper, showing the slits which define the individual blanks out of which the trays are formed.

Fig. 9 is a plan view of a butter tray made and formed on said machine from the blanks shown in Fig. 8.

Fig. 10 is a sectional view through said tray taken on the line 10—10 of Fig. 9.

Fig. 11 is a side view of the paper cutting and tray-forming means consisting of a cutter and a die.

Fig. 11a is a sectional view on the line 11a—11a of Fig. 11.

Fig. 12 is a face view of said cutter.

Fig. 13 is a view of the butter slicing and flipping mechanism whereby the butter is sliced from a bar and flipped from vertical to horizontal position onto a tray.

Fig. 14 is a view of the butter bar pusher.

Fig. 15 is a side view of said butter bar pusher showing the track on which it is mounted.

Fig. 16 is another view of said butter bar pusher, showing the ratchet mechanism by which it is moved forwardly in intermittent fashion.

Fig. 17 is a sectional view on the line 17—17 of Fig. 15, showing the platform on which the bar of butter is deposited and the track for the butter pusher.

Fig. 18 is a view of a cam which actuates parts of the mechanism herein described.

Fig. 19 is a plan view of the plate on which the paper is cut and in which it is formed into a tray.

Fig. 20 is a fragmentary view of a slidable component of the machine herein described.

Fig. 21 is a fragmentary view showing a strip of chip blanks folded together in accordion fashion and feeding into the machine in place of the rolled strip shown in Fig. 1.

For the purposes of this description, the machine herein claimed will first be described in relation to its butter slicing function and it will then be described in connection with its tray-making function. It will be understood, however, that both functions are performed at the same time and in synchronization with each other and at the conclusion of both series of operations, the butter is placed in the trays and dispensed or removed from the machine.

Referring now to Figs. 14 to 17 inclusive, it will be observed that a horizontal platform 10 is provided to receive a conventional bar of butter. This bar is usually square in cross-section and it weighs a quarter of a pound. A butter pusher 12 is slidably mounted on said platform 10 in order to push the butter toward the cutter where it is cut into relatively thin slices, commonly known as pats. A typical pat 14 is shown in Figs. 9 and 10. Butter pusher 12 is mounted on a slide 16 which is slidably mounted on said platform 10. This slide is provided with a pair of inwardly extending flanges 18 and 20 respectively which are adapted to slide within grooves or channels 22 and 24 formed below platform 10. In practice, platform 10 is integral with a bar 26 and grooves or channels 22 and 24 are formed in said bar, on opposite sides thereof, to define the platform 10.

It will be observed in Figs. 1 and 2 that bar 26 is secured to the table top 28 of the machine and that said table top is supported on a frame 30. Bar 26 extends transversely of the machine so that a person standing in front of it may easily service the machine by replacing each consumed bar of butter with a fresh bar.

A ratchet 32 is slidably mounted on flange 34 of bar 26 for reciprocating movement as the doubled-headed arrow in Fig. 16 clearly shows. A pawl 36 is pivotally mounted by means of pin 38 on slide 16 and a spring 40 urges said pawl into engagement with the teeth of said ratchet 32. When the ratchet moves forwardly, that is, leftwardly as viewed in Fig. 16, it carries the pawl 36 and slide 16 along with it. When the ratchet moves rearwardly (rightwardly as viewed in Fig. 16) the pawl slips across its teeth and the slide 16 remains by reason of friction in its previously advanced position. When the ratchet again moves forwardly, the slide once again moves forwardly with it and each time the extent of forward movement corresponds to the thickness of a pat of butter and this is governed by a mechanism which will shortly be described. When a bar of butter has been fully consumed in the process herein described, it may be replaced on the platform 10 by another bar of butter but in order to do this it is necessary to retract the pusher 12 to its original position. This is done by pressing upon the upper end 36a of pawl 36 and forcibly disengaging it from the ratchet against the action of spring 40 and then sliding the slide 16 back to its original position.

The mechanism which reciprocates the ratchet will now be described. The motive power is provided by electric motor M which is supported on the bottom wall or frame member 50 of frame 30. Attached to the shaft of said motor is a worm 52 which engages a worm wheel 54 mounted on axle 56. This axle is properly supported on plates 58 and so is the worm. More particularly, blocks 60 are supported by plates 58 and bearings 62 in said blocks support the worm. Worm wheel 54 is fixed to said shaft so that when said wheel rotates, said shaft rotates with it.

Secured to shaft 56 is a wheel 70 which has a radially outwardly extending cam formation 72 formed thereon. This cam 72 is engageable with a pivoted bar 74 and more specifically with its inclined edge 76. This bar 74 is pivotally secured to the frame of the machine by means of a pin 78 which constitutes its pivot. When wheel 70 rotates in the direction of arrow 80, cam 72 will engage the sloping edge 76 of pivoted bar 74 and cause said bar to pivot in counter-clockwise direction as viewed in Fig. 2. A link 82 is pivotally secured at one end to the upper end of pivoted bar 74 and a spring 84 is secured to the opposite end of said link. The spring is also attached by means of fastening member 86 to the frame of the machine. The spring tends to pull link 82 rightwardly as viewed in Fig. 2 and it thereby tends to urge bar 74 to pivot in clockwise direction. Consequently, when said bar 74 is struck by the cam 72, it is swung in counter-clockwise direction against the action of said spring and when said cam disengages said bar, the spring swings it back in clockwise direction.

It will be observed that a bar 90 is pivotally secured by means of pin 92 to that end of link 82 to which the spring 84 is connected. Said bar 90 is secured to a slide 94 which has an arm 96 projecting forwardly therefrom (leftwardly as viewed in Fig. 2). A pin 98 is supported by said arm 96 in engagement with ratchet 32 above described. See Figs. 4 and 16. Slide 94 is slidably movable along a track 100 (Fig. 4) both rightwardly and leftwardly in parallel relation to the above described movement of the ratchet and the butter pusher. A block 102 is fastened to the frame of the machine behind slide 94 and an adjustable stop screw 104 is supported by said block for engagement with said slide. This stop screw limits the rearward movement of slide 94.

It will now be understood that when wheel 70 is caused to rotate in clockwise direction as viewed in Fig. 2, cam 72 will cause arm 74 to pivot in counter-clockwise direction, and cause slide 94 to move leftwardly, also as viewed in Fig. 2, or rightwardly as viewed in Fig. 4. Since this slide 94 carries pin 98 and since said pin is in engagement with the ratchet, a corresponding movement of the ratchet will take place and it will carry the butter pusher along with it, leftwardly as viewed in Fig. 16. The moment cam 72 disengages said bar 74, spring 84 will cause the slide 94 to retract to its original position in engagement with screw 104 and this will also have the effect of moving the ratchet backwardly. Since the pawl 36 will now slip over the ratchet teeth, this rearward movement of the ratchet will not have the effect of moving the butter pusher rearwardly and consequently said butter pusher will remain in its advanced position. Each forward movement of the butter pusher corresponds in extent to the thickness of the butter pats which are to be cut. This thickness may be adjusted to make the pats either thicker or thinner by simply adjusting the position of the stop screw 104.

The butter feeding mechanism has now been described and the butter slicing action will now be described. The butter slicer is simply a wire 110 which extends across a frame 112 of inverted U-shape. This frame is wide enough and high enough in its inside dimensions to receive the forwardly disposed end of a conventional bar of butter. Wire 110 may be supported across the open bottom end of said frame 112 in any desirable manner. One way is shown in Fig. 13 wherein it appears that the wire extends around a pair of pins 114 and 116 which are secured to the lower ends of the legs of said frame 112 and the ends of said wire then extend upwardly along said legs and are secured thereto by means of screws 118 and 120 respectively.

When the butter advances as above described, frame 112 is in an upward or inoperative position. It is adapted to move downwardly to bring wire 110 into cutting engagement with the butter to slice off a pat. The mechanism causing said frame to engage in vertical movement will now be described. A pair of uprights 130 and 132 are supported on the frame 30 of the machine. They serve as guides for a crossbar 134 which is vertically movable along said uprights as indicated by arrow 136 in Fig. 2 and 138 in Fig. 1. Frame 112 is adjustably secured to said crossbar 134 by means of an adjustable bracket 140 and screws 142 which secures said bracket to said crossbar. It will be noted that said bracket 140 is provided with a pair of horizontally extending slots 144 which accommodate said screws 142 and render it possible to adjust the position of frame 112 either leftwardly or rightwardly in a horizontal path as viewed in Fig. 1. This will adjust the position of the butter cutter relative to the butter and also relative to the tray-making mechanism hereinafter described.

Secured to crossbar 134 is a vertically extending bar 150 shown in Figs. 1, 2 and 18. Secured to the lower end of said bar 150 is a cam follower 152 in the form of a roller. This roller rides within an annular cam groove 154 formed in wheel 70. It will be observed that this annular cam groove is eccentrically positioned relative to said wheel and consequently, when the wheel rotates as above described, the cam follower will follow said annular groove in a vertical path and bar 150 and crossbar 134 will thereby be caused to engage in vertical movement in both directions. On the downward movement of said bar and crossbar, butter-cutting frame 112 will descend integrally with them and a slice of butter will thereby be cut from the butter bar. On the upward stroke of said bar and crossbar, the butter cutting frame will of course move upwardly with them and wire 110 which has cut a pat from the butter bar will now be retracted preparatory to the next stroke.

The means for transferring the pat of butter from its severed position, which is vertical, to its tray position, which is horizontal, is shown in Figs. 1 and 13. It will be seen that a rod 160 is supported by bearings 162 and 164 on butter cutting frame 112 and it will be understood that said rod is angularly movable about its longitudinal axis. It has a laterally extending arm 166 at one end and a second laterally extending arm 168 at its opposite end. A butter flipper 170 is mounted on said rod 160 intermediate its ends and it will be seen in Figs. 1 and 13 that this butter flipper is simply a slightly bowed leaf which normally projects vertically upwardly from said rod 160. A spring 172 is secured at one end to butter cutting plate 112 and at its opposite end to lateral arm 166. The action of the spring is to urge rod 160 to turn in such direction that flipper 170 is brought upwardly to its Fig. 13 position and maintained in said position.

It will be noted in Fig. 2 that transversely extending arm 168 is L-shaped and that it is engaged by a laterally extending arm 180 of a bar 182. This bar 182 is supported on a crossbar 184 which is secured at one end to a spring 186 and at its opposite end to an arm 188. A bolt 190 pivotally secures said crossbar 184 to said arm 188 so that relative pivotal movement between them may take place. Arm 188 is pivotally secured at its lower end by means of bolt 192 to the frame 30 of the machine. Arm 188 is positioned, like bar 74, for engagement with cam 72 on wheel 70. When the cam engages said arm 188, it moves it leftwardly as viewed in Fig. 2, that is, in counter-clockwise direction, and crossbar 184 is thereby also moved leftwardly against the action of spring 186. This leftward movement of crossbar 184 causes arm 180 to engage arm 168 and to cam said arm 168 in counter-clockwise direction, thereby causing rod 160 to turn in counter-clockwise direction, all as viewed in Fig. 2, whereby the butter flipper 170 is caused to flip the butter pat from its original vertical position over to a horizontal position on a tray. It will be understood at this point that when the butter cutting wire 110 descends with frame 112 to cut the butter, flipper 170 will accompany it and enter the cut between the bar of butter and the newly formed pat. Since the flipper is slightly bowed, this will have the effect of separating the pat of butter from the bar preparatory to the flipping action.

We now turn to the tray forming mechanism. It will be observed in Figs. 1, 7 and 8 that a roll of paper 200 is rotatably supported on a spindle 202 which is mounted on the frame of the machine. This paper consists of a continuous strip 204 of relatively heavy paper, the kind conventionally used in making trays or chips for pats of butter. Said strip 204 is die-cut to provide a plurality of aligned but spaced slits 206 on opposite sides of the strip, thereby forming individual squares 208 which are joined to each other by means of narrow necks 210 formed between each pair of slits 206. The corners 212 of said squares may be rounded to produce a better looking tray. This strip 204 is fed in intermittent fashion to a cutting mechanism which severs the individual squares from the rest of the strip. The feeding mechanism is best shown in Figs. 1, 2, 5 and 20. It will be seen in Fig. 1 that the strip 204 is fed through a guide 214 which carries it to a ramp 216. Slidably mounted on said ramp is a plate 220 which is provided with a pair of spaced lugs or fingers 222 and 224 respectively. These lugs or fingers are engageable with the edges of the individual squares 208 as Fig. 5 clearly shows. A leaf spring 226 supported on a bracket 228 presses the strip 204 down in its connected center portion, thereby forcing the strip out of a flat plane since its marginal edges remain elevated upon the lugs or fingers 222 and 224. It will now be seen that plate 220 with its said lugs or fingers 222 and 224 is caused to engage in reciprocating movement in a generally horizontal plane to enable said lugs or fingers to engage the edges of the individual squares 208 along their respective slits 206, and thereby to advance the entire strip 204.

A cam 230 is secured to shaft 56 and said cam moves in a rotary path with said shaft and with wheel 70 above mentioned. Pivotally mounted on one of the plates 58 is a bellcrank 232 and it will be observed that cam 230 is engageable therewith to move said bellcrank in counter-clockwise direction as viewed in Fig. 2. The upper end of said bellcrank is pivotally secured by means of bolt 234 to a bar 236 and said bar is pivotally secured by means of bolt 238 to a slide 240. This slide is guided in a track 242, secured by means of screw 244 to the frame of the machine, for movement in a horizontal path. It will now be observed in Fig. 20 that plate 220 is mounted on slide 240 and is movable integrally therewith. Consequently, when shaft 56 is caused to rotate and cam 230 causes bellcrank 232 to pivot in counter-clockwise direction, bar 236 will pull slide 240 and plate 220 forwardly, that is, leftwardly as viewed in Fig. 2 and rightwardly as viewed in Fig. 5. This has the effect of bringing the lugs or fingers 222 and 224 into engagement with the edges of the individual squares 208, in their said slits, in order to advance the strip 204.

In the foregoing discussion, cam 230 has been considered as engaging arm 231 of bellcrank 232. When said cam is swung around in clockwise direction, eventually it will disengage said arm 231 and will then engage the opposite arm 233 of said bellcrank. This will have the effect of pivoting the bellcrank in clockwise direction as viewed in Fig. 2 and causing slide 240 and plate 220 to retract to their original positions. However, to insure a rearward movement of said slide and plate at the proper time, it may be necessary to rely on other means shown in the drawing. Reference is here made to a bar 270 which is secured at one end to bar 236, by means of a bracket 271, and which is bent downwardly at its opposite end to form a downwardly projecting end portion 272. See Figs. 2 and 5. A pin 274 on wheel 70 is engageable with said end portion 272 in order to move said bar 270 rearwardly (rightwardly as viewed in Fig. 2) in order to move bar 236 rearwardly and slide 240 and plate 220 with it.

To prevent a corresponding rearward movement of the strip 204, a frictional stop member 250 shown in Figs. 1 and 6 is provided. This is simply a triangular block having a relatively sharp or pointed edge 252 in engagement with the center portion of strip 204. Said stop member 250 is pivotally secured by pin 254 to a bar 256 on support 258. A leaf spring 260 is mounted at one end on bar 256 and its opposite end engages the stop member 250, thereby holding it in frictional engagement with strip 204. The strip is free to move forwardly (rightwardly as viewed in Fig. 6) but it is prevented from moving in the opposite direction.

The strip cutting mechanism will now be described, reference being had particularly to Figs. 1, 11 and 12. It will be observed that a bracket 280 is secured to crossbar 134 by means of screws 282 and that secured thereto is a pair of arms 286 and 288 respectively. A rectangular box-like member 290 is provided with a plate 292 and with cutouts 294 below said plate.

It will now be seen that box 290 may be mounted on bracket arms 286 and 288 by simply sliding said bracket arms into the cutouts 294, in which case plate 292 will rest upon said bracket arms and will support the box thereon. In practice, of course, the bracket arms being attached to the machine would be stationary and the box would be slipped upon it. A set screw 296 in one of the bracket arms 286 may be provided for engagement with said box 290 in order to clamp it in place on said bracket arms.

A knife 300 may be secured to one side of said box 290 by means of screws 302. It will be observed that in face view said knife 300 has a generally rounded lower edge, including a sharp cutting edge 304. Since this knife is attached to box 290 and since said box is attached to the crossbar 134, it will be understood that when said crossbar is caused to engage in vertical movement, said knife will move integrally with it.

The path of the paper strip 204 should now be followed. It will be observed that the feeding mechanism above described will feed the paper strip from ramp 216 to a second ramp 310. Guide members 312 will confine the paper strip to ramp 310 until the paper reaches a plate or plates 314 at table level. The individual squares 208 which comprise said paper strip 204 in connected fashion are now ready to receive the individual pats of butter which are cut and flipped by the mechanism above described. As each pat of butter is thereby placed upon an individual square 208, the strip advances until the square with the pat of butter thereon is positioned under the box 290 with its neck 210 connecting it to the next square in the strip positioned under the knife 300.

It will now be noted that box 290 is a hollow structure, see Fig. 11a, and that each of its lower edges is beveled to form a forming punch 320. Since there are four sides to said box 290, there will be four such beveled edges 320 to define a square, hollow punch whose dimensions are such as to enable it to receive the pat of butter without touching any part of it. Below box 20 is a die plate 322 having a square opening 324 formed therein with beveled side edges 326 to constitute a die adapted to cooperate with the punch 320, also a slot 327 for the knife 300.

It will be seen that the cutting edge 304 of knife 300 projects slightly below the beveled edges of the punch 320. Consequently, when crossbar 134 moves downwardly, and box 290 and knife 300 are carried downwardly with it, said knife will engage and sever the neck 210 of the strip of paper 204, thereby feeing the leading square 208, Immediately following this operation, the punch 320 will engage said square 208 and press it into the opening 324 of die 326. The marginal edges 208a of the square 208 will now be pressed upwardly as its square center portion is pressed downwardly in order to form the tray or chip 208b. It will be observed in Fig. 19 that indented corners 325 are formed where the beveled 326 meet. It will now be understood that these indented corners or recesses are adapted to form the corners 208c of the tray 208b as shown in Fig. 9. Once each tray is forced through the die 326, together with the pat of butter supported thereon, it drops upon a chute 330 and thence into any suitable receptacle.

Referring now to Fig. 21, it will be observed that a strip 205 is provided in place of the strip 204 above described. The two strips are identical except that strip 204 is wound into a roll or reel, as shown in Fig. 1 and it is then fed to the machine in the manner above described, whereas strip 205 is folded in accordion fashion, consisting of a plurality of layers 203 joined at their respective ends and disposed flat one upon the other. Each layer shown in Fig. 21 consists of three individual blanks 208 but this is purely illustrative and it will be understood that the layers may be made to consist of any suitable number of blanks, such as two, four or more. It has been found that an accordion folded strip such as that shown in Fig. 21 feeds very readily to the machine herein described and claimed.

The foregoing is illustrative of preferred forms of this invention and it will be understood that these preferred forms may be modified and other forms may be provided within the broad spirit of the invention and the broad scope of the claims.

I claim:

1. A machine for cutting individual pats of butter from a butter bar, depositing them upon a continuous strip of paper, and forming individual trays for said pats of butter from said strip of paper without disturbing the pats of butter thereon, said machine comprising a support for a bar of butter, a reciprocally movable knife situated at one end of said support, means for feeding said bar of butter intermittently to said knife, said knife being engageable with said bar of butter to sever it into individual pats of butter, a second intermittent feeding means for intermittently feeding a continuous strip of paper to a station adjacent said knife, whereby the individual pats of butter are enabled to drop upon said strip of paper as they are severed from the bar of butter, a second knife mounted for reciprocating movement and adapted to engage and cut the strip of paper between the pats of butter deposited thereon to form individual sheets of paper, each with a pat of butter thereon, and a hollow punch and die which are adapted to receive the sheets of paper between them, said punch being movable into engagement with said sheets of paper and to coact with the die to form trays out of said sheets of paper without disturbing the pats of butter thereon, said butter cutting knife comprising a wire which is strung across a frame of inverted U-shape, said frame being adapted to receive the bar of butter between its two legs, and a butter flipper pivotally mounted on said frame above said wire, said frame being vertically movable to bring said wire into cutting engagement with said bar of butter to cut a pat therefrom, and said butter flipper being movable with said frame into the cut formed by said knife between the newly formed pat of butter and the remaining bar of butter, and means causing pivotal movement of said butter flipper to push it against said newly formed pat of butter and to flip it upon the continuous strip of paper.

2. A machine in accordance with claim 1, wherein the butter feeding means comprises a butter pusher slidably mounted on said support, a spring-urged pawl on said pusher, and a reciprocally movable ratchet mounted adjacent said support and parallel thereto, said pawl being in engagement with said ratchet, whereby movement of said ratchet in one direction causes the pawl and pusher to move therewith in the same direction on said support, thereby feeding the butter, and whereby the pawl slips across the ratchet when the ratchet moves in the opposite direction to prevent backward movement of said pusher and said butter and to provide a time interval during which the butter remains stationary.

3. A machine for cutting individual pats of butter from a butter bar, depositing them upon a continuous strip of paper, and forming individual trays for said pats of butter from said strip of paper without disturbing the pats of butter thereon, said machine comprising a support for a bar of butter, a reciprocally movable knife situated at one end of said support, means for feeding said bar of butter intermittently to said knife, said knife being engageable with said bar of butter to sever it into individual pats of butter, a second intermittent feeding means for intermittently feeding a continuous strip of paper to a station adjacent said knife, whereby the individual pats of butter are enabled to drop upon said strip of paper as they are severed from the bar of butter, a second knife mounted for reciprocating movement and adapted to engage and cut the strip of paper between the pats of butter deposited thereon to form individual sheets of paper, each with a pat of butter thereon, and a hollow punch and die which are adapted to receive the sheets of paper between them, said punch being movable into engagement with said sheets of paper and to coact with the die to form trays out of said sheets of paper without disturbing the pats of butter thereon, said butter feeding means being adjustable for cutting slices of selected thicknesses, said butter feeding means comprising a butter pusher which is slidably mounted on said support, a spring-urged pawl on said pusher, a reciprocally movable ratchet mounted adjacent said support and parallel thereto, means for intermittently advancing the ratchet in one direction wherein the pawl is locked to advance the butter pusher in the same direction and thereby to feed the butter to the butter cutting knife, a spring connected to the ratchet to retract it intermediate its intermittent advancing movements, wherein the pawl slips across the ratchet to prevent backward movement of the butter pusher and to provide a time interval during which the butter remains stationary, and an adjustable stop member which limits the backward movement of the ratchet to determine and control the range of its movement between its fully advanced position and its fully retracted position and thereby to determine and control the thickness of the slices cut from said bar of butter.

4. In a machine for cutting individual pats of butter from a butter bar and depositing them upon tray paper, a butter-cutting knife which comprises a wire strung across a frame of inverted U-shape, said frame being adapted to receive the bar of butter between its two legs, and a butter flipper pivotally mounted on said frame above said wire, said frame being vertically movable to bring said wire into cutting engagement with said bar of butter to cut a pat therefrom, and said butter flipper being movable with said frame into the cut formed by said wire between the newly formed pat of butter and the remaining bar of butter, and means causing pivotal movement of said butter flipper to push it against the newly formed pat of butter and to flip it over upon the tray paper.

References Cited in the file of this patent

UNITED STATES PATENTS

| | | |
|---|---|---|
| 459,516 | Wheeler | Sept. 15, 1891 |
| 889,950 | Morrison | June 9, 1908 |
| 943,652 | Coe | Dec. 21, 1909 |
| 2,107,036 | Heinesman | Feb. 1, 1938 |
| 2,334,256 | Eaton | Nov. 16, 1943 |
| 2,635,965 | Hensgen | Apr. 21, 1953 |
| 2,718,701 | Fromwiller | Sept. 27, 1955 |